(12) United States Patent
Morikawa et al.

(10) Patent No.: US 10,382,747 B2
(45) Date of Patent: Aug. 13, 2019

(54) IMAGE PROCESSING APPARATUS, IMAGE PROCESSING METHOD, AND IMAGE PROCESSING PROGRAM

(71) Applicant: Topcon Corporation, Itabashi-ku, Tokyo (JP)

(72) Inventors: Naoki Morikawa, Asaka (JP); Tadayuki Ito, Tokyo (JP)

(73) Assignee: Topcon Corporation, Itabashi-ku, Tokyo (JP)

( * ) Notice: Subject to any disclaimer, the term of this patent is extended or adjusted under 35 U.S.C. 154(b) by 29 days.

(21) Appl. No.: 15/712,288

(22) Filed: Sep. 22, 2017

(65) Prior Publication Data
US 2018/0091802 A1    Mar. 29, 2018

(30) Foreign Application Priority Data

Sep. 27, 2016  (JP) .................................. 2016-188223

(51) Int. Cl.
| | | |
|---|---|---|
| *H04N 13/351* | (2018.01) | |
| *G06T 19/00* | (2011.01) | |
| *H04N 13/324* | (2018.01) | |
| *H04N 13/398* | (2018.01) | |

(52) U.S. Cl.
CPC ........... *H04N 13/351* (2018.05); *G06T 19/00* (2013.01); *H04N 13/324* (2018.05); *H04N 13/398* (2018.05)

(58) Field of Classification Search
USPC ....................................................... 348/51
See application file for complete search history.

(56) References Cited

U.S. PATENT DOCUMENTS

| | | | |
|---|---|---|---|
| 9,207,069 B2 | 12/2015 | Kitamura et al. | |
| 2012/0256916 A1* | 10/2012 | Kitamura ............... | G01B 11/24 345/419 |
| 2013/0176305 A1* | 7/2013 | Ito ........................... | G06T 17/00 345/420 |
| 2014/0037194 A1* | 2/2014 | Kitamura ............... | G01B 11/24 382/154 |
| 2014/0285794 A1* | 9/2014 | Ito .......................... | G01B 11/24 356/73 |
| 2015/2006023 | 7/2015 | Kochi et al. | |
| 2015/0234782 A1* | 8/2015 | Ito .......................... | G06F 17/50 708/441 |
| 2016/0364905 A1* | 12/2016 | Jung ....................... | G06T 17/20 |

FOREIGN PATENT DOCUMENTS

| | | |
|---|---|---|
| JP | 2012-230594 A | 11/2012 |
| JP | 2014-035702 A | 2/2014 |
| WO | 2011/070927 A1 | 6/2011 |

* cited by examiner

*Primary Examiner* — Behrooz M Senfi
(74) *Attorney, Agent, or Firm* — Chiesa Shahinian & Giantomasi PC

(57) ABSTRACT

An image processing apparatus is provided to display an image on a screen, the image facilitating visual ascertainment of relationships between each of a plurality of items of point cloud data and point cloud data arising from combining the plurality of items of point cloud data. The image processing apparatus includes a display controlling section configured to 3D display combination point cloud data combining a plurality of items of point cloud data obtained from a plurality of viewpoints and allow 3D display of one item out of the plurality of items of point cloud data obtained from the plurality of viewpoints.

18 Claims, 4 Drawing Sheets

IMAGE PROCESSING APPARATUS, IMAGE PROCESSING METHOD, AND IMAGE PROCESSING PROGRAM

CROSS-REFERENCE TO RELATED APPLICATIONS

This application claims the benefit of Japanese Patent Application No. 2016-188223, filed Sep. 27, 2016, which is incorporated herein by reference in its entirety.

BACKGROUND

1. Technical Field

The present invention relates to an image processing technology for point cloud data.

2. Related Art

Point cloud data obtained by laser scanning and by stereo photogrammetry is known (see, for example, WO 2011/070927 and JP 2012-230594A).

SUMMARY 3D display of point cloud data on a display, such as on a PC display, results in a three-dimensional shape of a measurement target object being displayed by a point cloud. A principle method using point cloud data is technology in which a three-dimensional model is obtained from the point cloud data. The three-dimensional model is a model in which an outline of the target object is displayed, and therefore has high affinity with three-dimensional data handling in CAD software.

Point cloud data cannot be acquired in a blind spot of a viewpoint. Point cloud data accordingly needs to be acquired from a plurality of viewpoints, and an operation to positionally align and combine the point cloud data from the plurality of viewpoints is needed. When performing such an operation, being able to visually ascertain relationships between each item of point cloud data and combination point cloud data would be useful.

An object of the invention is accordingly to provide technology for displaying an image on a screen, the image facilitating visual ascertainment of relationships between each of a plurality of items of point cloud data and point cloud data arising from combining the plurality of items of point cloud data.

A first aspect of the invention relates to an image processing apparatus including a display controlling section. The display controlling section therein is configured to 3D display combination point cloud data combining a plurality of items of point cloud data obtained from a plurality of viewpoints, and allow 3D display of one item out of the plurality of items of point cloud data obtained from the plurality of viewpoints.

A second aspect of the invention relates to the first aspect of the invention, wherein the combination point cloud data being 3D displayed and the one item out of the plurality of items of point cloud data obtained from the plurality of viewpoints being 3D displayed are displayed in a hierarchy.

A third aspect of the invention relates to the first aspect or the second aspect of the invention, wherein in the 3D display of the combination point cloud data, each of the plurality of items of point cloud data obtained from the plurality of viewpoints is 3D displayed in an identifiable state.

A fourth aspect of the invention relates to the third aspect of the invention, wherein each of the plurality of items of point cloud data obtained from the plurality of viewpoints is colored with a different color.

A fifth aspect of the invention relates to any one of the first to the fourth aspects of the invention, wherein a mark is displayed on a screen employed to positionally align the plurality of items of point cloud data with each other, the mark allowing discrimination between good and bad in positional alignment of a target.

A sixth aspect of the invention relates to an image processing method that includes 3D displaying combination point cloud data combining a plurality of items of point cloud data obtained from a plurality of viewpoints, and allowing one item out of the plurality of items of point cloud data obtained from the plurality of viewpoints to be 3D displayed.

A seventh aspect of the invention relates to a computer readable medium having software instructions thereon that causes a computer to operate as a display controlling section. The display controlling section is configured to 3D display combination point cloud data combining a plurality of items of point cloud data obtained from a plurality of viewpoints, and allow 3D display of one item out of the plurality of items of point cloud data obtained from the plurality of viewpoints.

According to an aspect of the invention, technology is provided to display an image on a screen, the image facilitating visual ascertainment of relationships between a plurality of items of point cloud data and point cloud data arising from combining the plurality of items of point cloud data.

DESCRIPTION OF EMBODIMENTS

Figure 1:
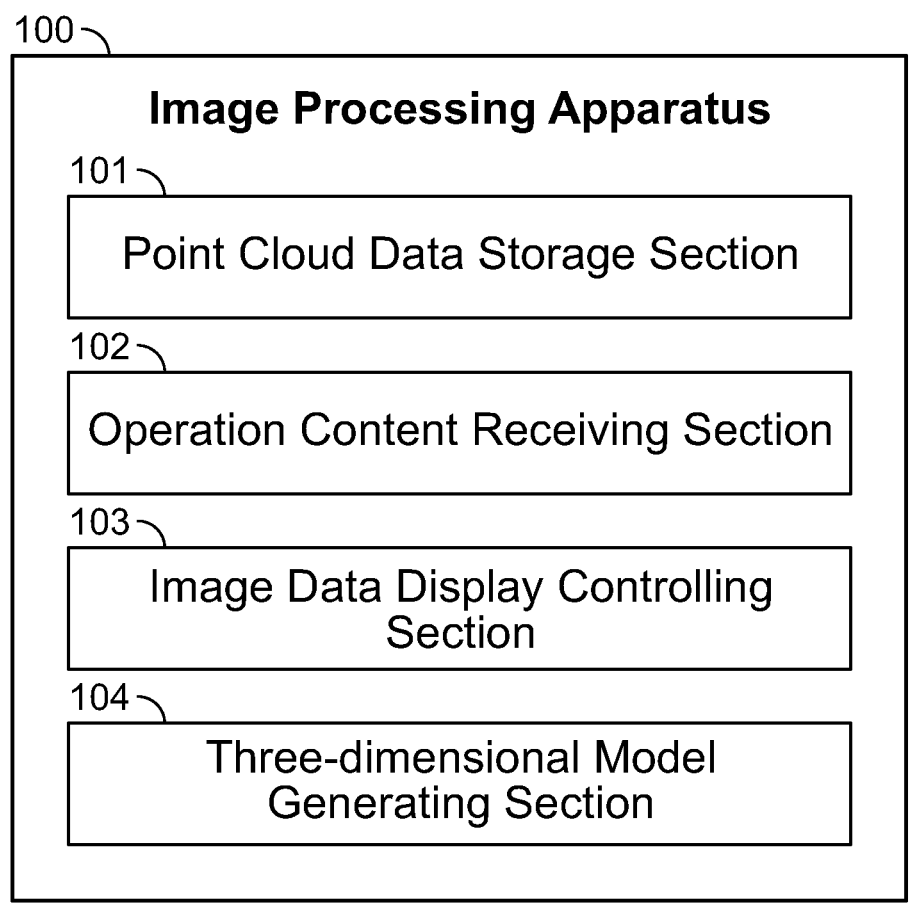
FIG. 1 is a block diagram of an embodiment.

FIG. 1 illustrates an image processing apparatus 100. The image processing apparatus 100 is an apparatus to process point cloud data. Rather than being dedicated hardware, the image processing apparatus 100 is normally implemented through software, by installing application software implementing the functions of the image processing apparatus 100 on a personal computer (PC), and then starting up the application software.

Each of the functional sections illustrated in FIG. 1 are configured through software in cases in which a PC is utilized. Each of the functional sections illustrated in FIG. 1 may be configured by a dedicated computation circuit. Note that a mix of functional sections configured through software and functional sections configured through dedicated computation circuits may also be employed. For example, the illustrated functional sections may be configured by electronic circuits such as a central processing unit (CPU), an Application Specific Integrated Circuit (ASIC), or a programmable logic device (PLD) such as a Field Programmable Gate Array (FPGA).

Whether to configure the functional sections through dedicated hardware, or to configure the functional sections through software by using a CPU to execute a program, is decided in consideration of the required computation speed, cost, power consumption, and the like. For example, configuring a particular functional section by a FPGA is advantageous from the perspective of improving processing speed, but increases the cost. On the other hand, a configuration implementing a particular functional section by using a CPU to execute a program stored on a computer readable medium is advantageous from the cost perspective due to being able to make savings on hardware resources. However, the processing speed when a functional section is implemented by a CPU is inferior to that when implemented by dedicated hardware. Although there are the above stated differences between configuring functional sections by dedicated hardware and configuring functional sections through software, these two options are equivalent from the perspective of both implementing a particular function.

The image processing apparatus 100 includes a point cloud data storage section 101, an operation content receiving section 102, an image data display controlling section 103, and a three-dimensional model generating section 104. The point cloud data storage section 101 stores point cloud data measured by a three-dimensional laser scanner. The point cloud data can be obtained by a method of finding three-dimensional coordinates for numerous feature points extracted from an image captured using the principles of stereo photogrammetry.

The operation content receiving section 102 receives data related to the content of operations by an operator operating the image processing apparatus 100. For example, the operator performs various types of operation on a PC acting as the image processing apparatus 100, and the content of such operations on the PC by the operator when doing so is received by the operation content receiving section 102.

The image data display controlling section 103 performs controls for displaying the point cloud data on the PC or an appropriate display (a liquid crystal display, for example). Screen display may be by way of 2D display or 3D display.

Figure 2:
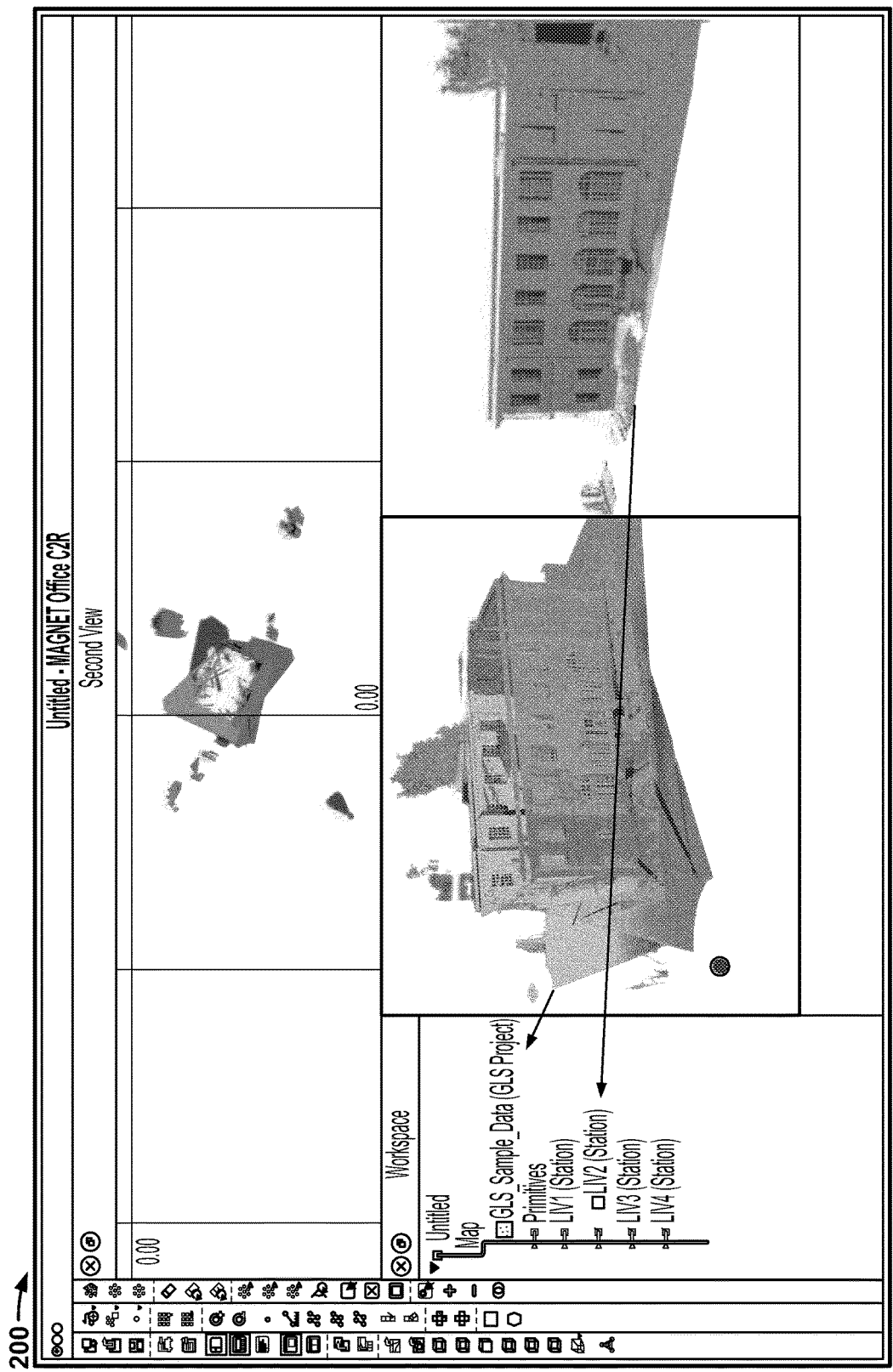
FIG. 2 is an illustrative example of a display screen.

FIG. 2 illustrates an example of screen display obtained by processing performed by the image data display controlling section 103. FIG. 2 illustrates a screen 200 divided into three. The upper center of the screen is a map display as viewed from vertically above. This illustrates a case in which a target object (a building) has been laser scanned from four viewpoints in four directions surrounding the target object, so as to obtain point cloud data of four groups.

The lower left of the screen is a 3D display of combination point cloud data arising from combining (describing in a single coordinate system) the point cloud data of four groups referred to above. An example is illustrated here in which point groups are displayed in a different color for each of the four viewpoints, so as to facilitate recognition of relationships between the combination point cloud data and each of the items of point cloud data.

The point cloud data at the bottom right of FIG. 2 is a 3D display of one item (one group) out of the point cloud data of four groups configuring the combination point cloud data at the bottom left of FIG. 2. In this case, the four color image of the screen on the left is point cloud data (combination point cloud data) at a high level in a hierarchy, and the green point cloud data on the right is point cloud data (one item out of the point cloud data of four groups configuring the combination point cloud data) at a low level in the hierarchy. A 3D display of point cloud data obtained from another viewpoint can be selected by clicking on the appropriate identifier for each screen, as displayed in a tree on the left of a user interface (UI) screen of FIG. 2.

The screen display of FIG. 2 facilitates visual ascertainment of the relationships between point cloud data (combination point cloud data) at a high level in a hierarchy and point cloud data (point cloud data obtained at each viewpoint) at a low level in the hierarchy. In particular, visual ascertainment is facilitated by a tree structure representing the combination point cloud data at a high level in the hierarchy and the plurality of items of point cloud data at a low level in the hierarchy. This is useful in cases in which a change to the viewpoint of a particular point cloud data is being investigated.

Figure 3:
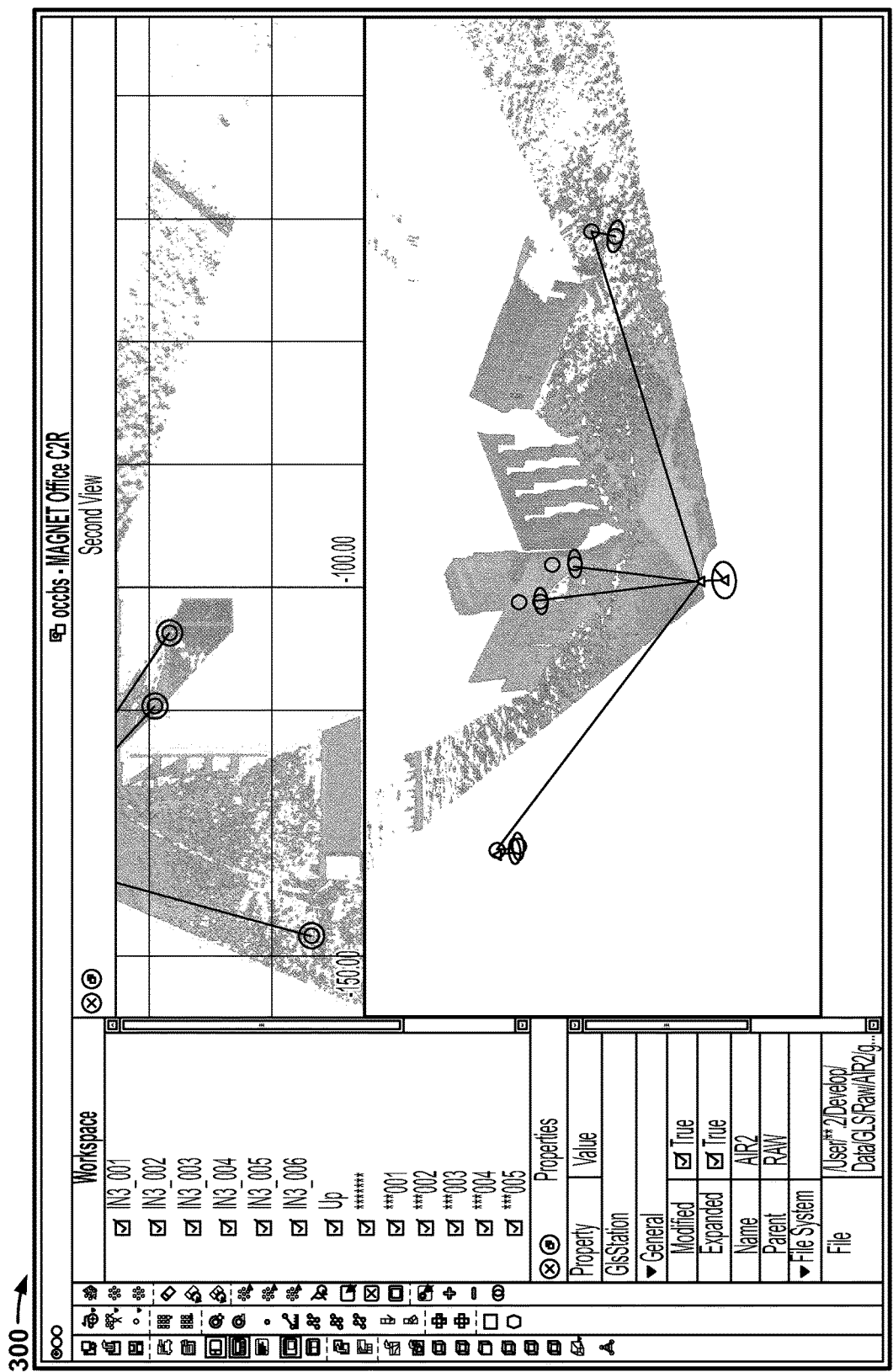
FIG. 3 is an illustrative example of a display screen.
Figure 4:
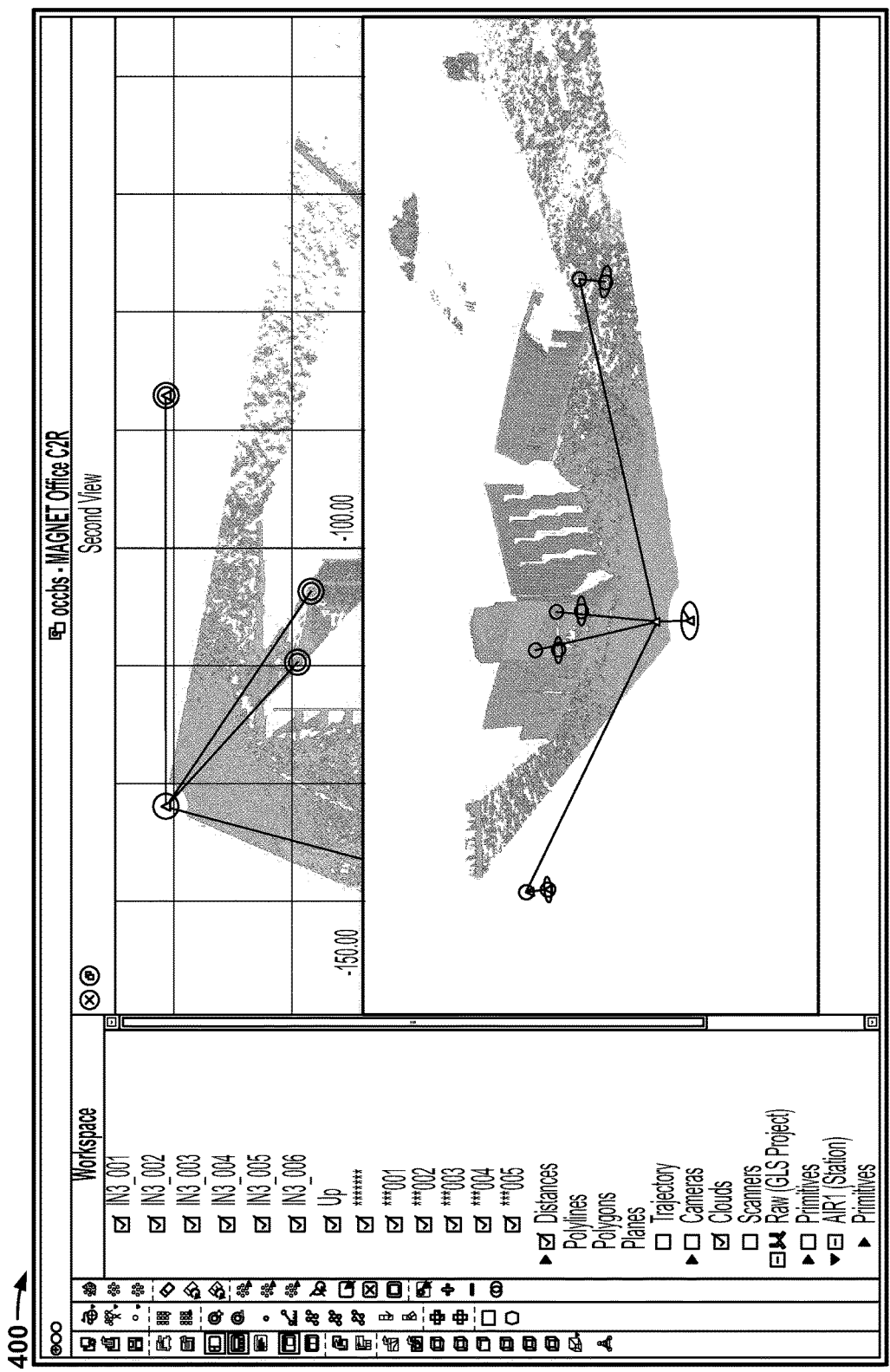
FIG. 4 is an illustrative example of a display screen.

FIG. 3 and FIG. 4 illustrate examples of screen displays 300 and 400, respectively, obtained by processing of the image data display controlling section 103. To acquire point group data, a plurality of positioning markers are placed in advance on a measurement target object, and two items of point cloud data from different viewpoints are positionally aligned (registration) using these markers.

In FIG. 3 and FIG. 4, a scanner (station) is illustrated by a solid triangle, and a target is illustrated by a circle outline. A target unit is illustrated by a yellow circle, which is employed for registration, and the color is changed to orange when positional alignment of the target unit and the scanner are achieved. When there is positional misalignment in registration, the triangles are displayed offset from the center of the circles as illustrated in FIG. 3, making it clear that positional alignment has not been achieved. When positional alignment has been achieved, a line is displayed from the center toward the circumference, such that an operator can recognize that positional alignment has been achieved.

Display is designed in the above manner to allow visual determination as to whether or not accurate positional alignment has been achieved during registration of a scanner. The display control for such display is performed by the image data display controlling section 103.

The three-dimensional model generating section 104 generates a three-dimensional model on the basis of the point cloud data. Technology to generate three-dimensional models from point cloud data may utilize any of the technology described in WO 2011/070927, JP 2012-230594A and JP 2014-35702A.

What is claimed is:
1. An image processing apparatus comprising:
a display controlling section configured to
display, in 3D, combination point cloud data which combines a plurality of items of point cloud data obtained from a plurality of viewpoints, and
allow display, in 3D, of one item out of the plurality of items of point cloud data obtained from the plurality of viewpoints,
wherein the combination point cloud data being displayed in 3D and the one item out of the plurality of items of point cloud data obtained from the plurality of viewpoints being displayed in 3D are displayed in a hierarchy.

2. The image processing apparatus according to claim 1, wherein, in the 3D display of the combination point cloud data, each of the plurality of items of point cloud data obtained from the plurality of viewpoints is 3D displayed in an identifiable state.

3. The image processing apparatus according to claim 2, wherein each of the plurality of items of point cloud data obtained from the plurality of viewpoints is colored with a different color.

4. The image processing apparatus according to claim 1, wherein a mark is displayed on a screen and employed to positionally align the plurality of items of point cloud data with each other, the mark allowing discrimination between good and bad in positional alignment of a target.

5. The image processing apparatus according to claim 2, wherein a mark is displayed on a screen and employed to positionally align the plurality of items of point cloud data with each other, the mark allowing discrimination between good and bad in positional alignment of a target.

6. The image processing apparatus according to claim 3, wherein a mark is displayed on a screen and employed to positionally align the plurality of items of point cloud data with each other, the mark allowing discrimination between good and bad in positional alignment of a target.

7. An image processing method comprising:
displaying, in 3D, combination point cloud data which combines a plurality of items of point cloud data obtained from a plurality of viewpoints; and
allowing one item out of the plurality of items of point cloud data obtained from the plurality of viewpoints to be 3D displayed in 3D,
wherein the combination point cloud data being displayed in 3D and the one item out of the plurality of items of point cloud data obtained from the plurality of viewpoints being displayed in 3D are displayed in a hierarchy.

8. A computer readable medium having software instructions thereon that causes a computer to operate as a display controlling section, the display controlling section being configured to
display, in 3D, combination point cloud data which combines a plurality of items of point cloud data obtained from a plurality of viewpoints, and
allow display, in 3D, of one item out of the plurality of items of point cloud data obtained from the plurality of viewpoints,
wherein the combination point cloud data being displayed in 3D and the one item out of the plurality of items of point cloud data obtained from the plurality of viewpoints being displayed in 3D are displayed in a hierarchy.

9. The image processing method according to claim 7, wherein, in the 3D display of the combination point cloud data, each of the plurality of items of point cloud data obtained from the plurality of viewpoints is 3D displayed in an identifiable state.

10. The image processing method according to claim 9, wherein each of the plurality of items of point cloud data obtained from the plurality of viewpoints is colored with a different color.

11. The image processing method according to claim 7, wherein a mark is displayed on a screen and employed to positionally align the plurality of items of point cloud data with each other, the mark allowing discrimination between good and bad in positional alignment of a target.

12. The image processing method according to claim 9, wherein a mark is displayed on a screen and employed to positionally align the plurality of items of point cloud data with each other, the mark allowing discrimination between good and bad in positional alignment of a target.

13. The image processing method according to claim 10, wherein a mark is displayed on a screen and employed to positionally align the plurality of items of point cloud data with each other, the mark allowing discrimination between good and bad in positional alignment of a target.

14. The computer readable medium according to claim 8, wherein, in the 3D display of the combination point cloud data, each of the plurality of items of point cloud data obtained from the plurality of viewpoints is 3D displayed in an identifiable state.

15. The computer readable medium according to claim 14, wherein each of the plurality of items of point cloud data obtained from the plurality of viewpoints is colored with a different color.

16. The computer readable medium according to claim 8, wherein a mark is displayed on a screen and employed to positionally align the plurality of items of point cloud data with each other, the mark allowing discrimination between good and bad in positional alignment of a target.

17. The computer readable medium according to claim 14, wherein a mark is displayed on a screen and employed to positionally align the plurality of items of point cloud data with each other, the mark allowing discrimination between good and bad in positional alignment of a target.

18. The computer readable medium according to claim 15, wherein a mark is displayed on a screen and employed to positionally align the plurality of items of point cloud data with each other, the mark allowing discrimination between good and bad in positional alignment of a target.

\* \* \* \* \*

UNITED STATES PATENT AND TRADEMARK OFFICE
CERTIFICATE OF CORRECTION

| | | |
|---|---|---|
| PATENT NO. | : 10,382,747 B2 | Page 1 of 1 |
| APPLICATION NO. | : 15/712288 | |
| DATED | : August 13, 2019 | |
| INVENTOR(S) | : Naoki Morikawa et al. | |

It is certified that error appears in the above-identified patent and that said Letters Patent is hereby corrected as shown below:

On the Title Page

At Item (72) Inventors, the residence information for Inventor Naoki Morikawa "Asaka (JP)" should read --Asaka-shi (JP)--

Signed and Sealed this
Twelfth Day of November, 2019

Andrei Iancu
*Director of the United States Patent and Trademark Office*